July 22, 1958     E. K. KOPPELMANN     2,843,918
BURNISHING TOOL
Filed Aug. 14, 1956     4 Sheets-Sheet 1
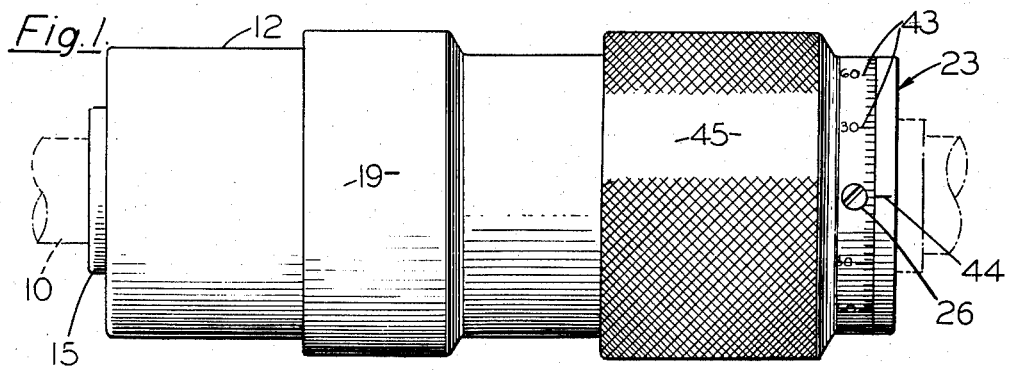
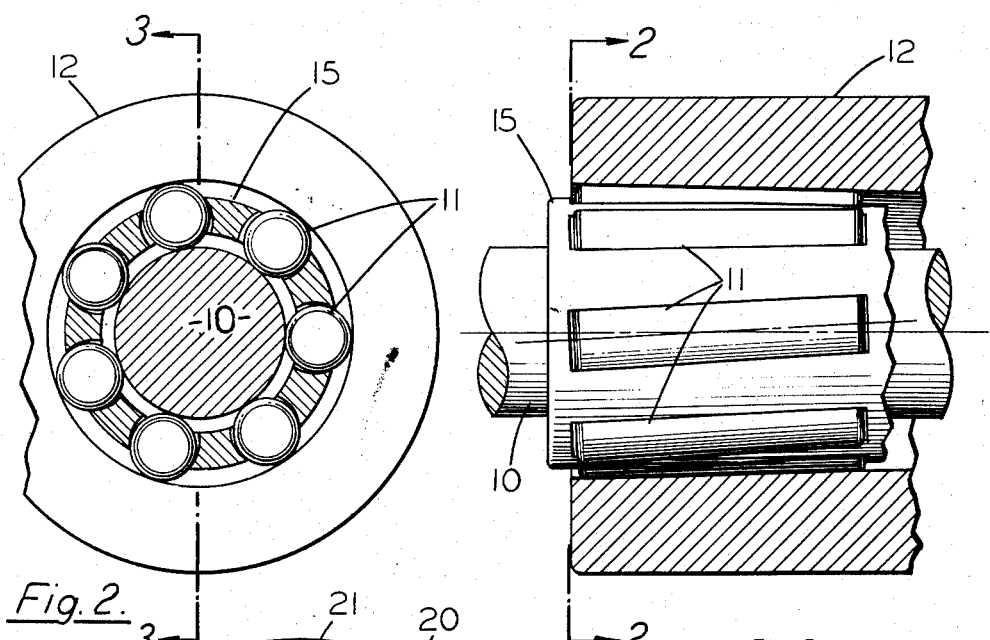
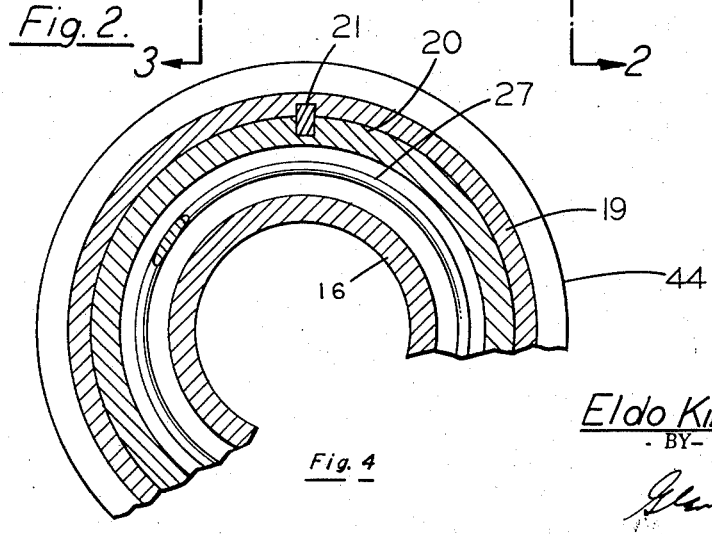
INVENTOR.
Eldo Kimroy Koppelmann
BY
Attorney July 22, 1958

E. K. KOPPELMANN 2,843,918

BURNISHING TOOL

Filed Aug. 14, 1956

INVENTOR.
Eldo Kimroy Koppelmann
BY
Attorney

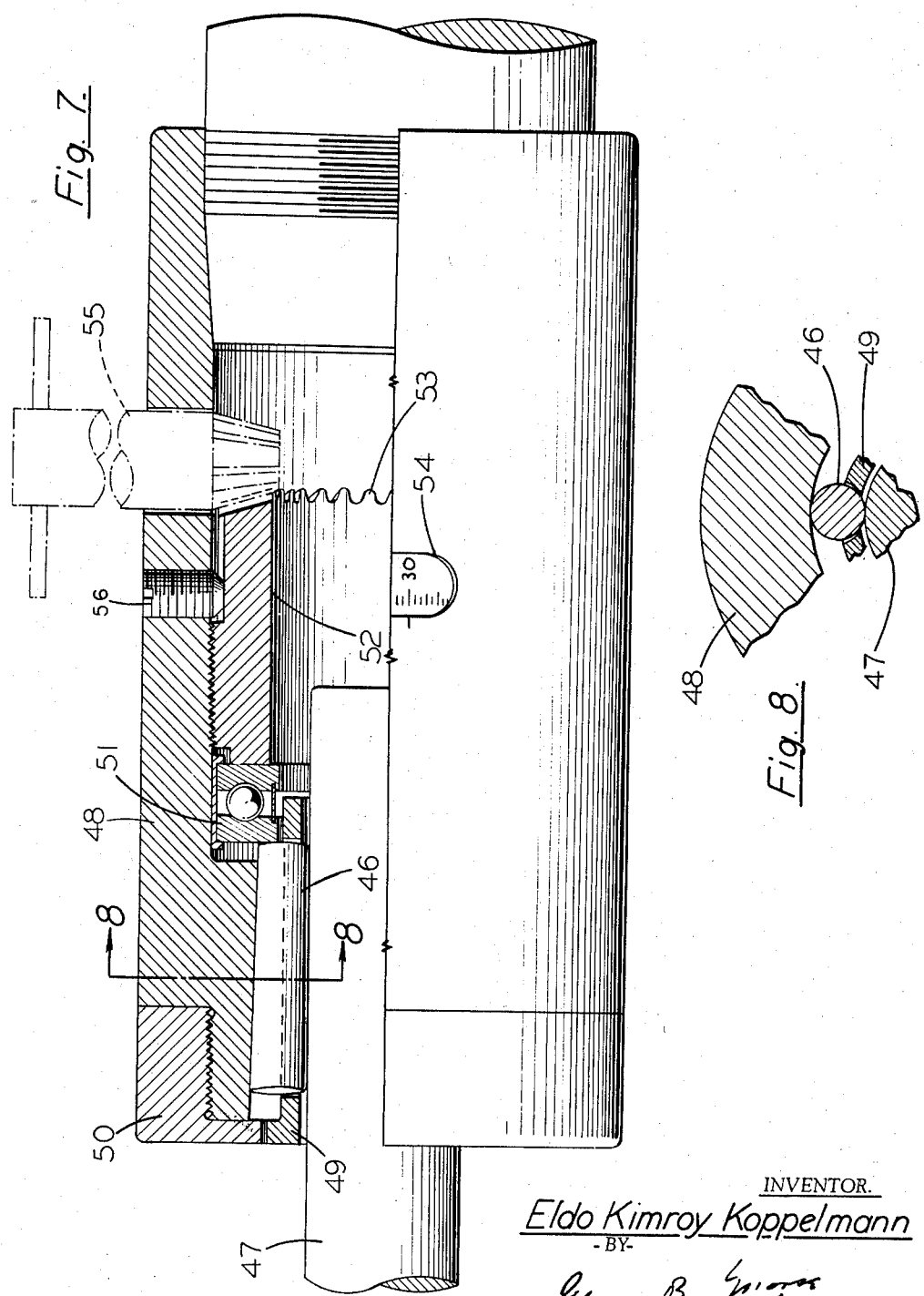

United States Patent Office 2,843,918
Patented July 22, 1958

2,843,918

BURNISHING TOOL

Eldo Kimroy Koppelmann, Moberly, Mo., assignor to Madison-Faessler Tool Company, Moberly, Mo.

Application August 14, 1956, Serial No. 603,942

6 Claims. (Cl. 29—90)

This invention provides a tool for burnishing exterior cylindrical surfaces. "Burnishing" is generally considered to involve a compacting of surface material of the workpiece under pressure, and is done either for the purpose of establishing a high-grade finish, for locally work-hardening the surface of the workpiece, or for accurately bringing the workpiece to a desired size, in combination with either of the two previous objectives. In the case of the present invention, the application of the intense pressure involves the use of a planetary system of rollers operating against the cylindrical workpiece under the confinement of an annular mandrel. The axes of the rollers are disposed somewhat askew to the axis of the mandrel and workpiece, resulting in a tendency of the rollers to move in a helical path around the surface of the workpiece, and thereby produce a self-feeding characteristic for the tool. The establishment of the pressure required to perform the burnishing operation is created through the formation of the inside diameter of the annular mandrel on a substantially frusto-conical configuration, coupled with the use of tapered rollers which result in an inscribed diameter inside the rollers of the proper size to establish the necessary burnishing conditions. The inscribed surface inside the rollers referred to above is not a perfect cylinder even in a geometrical sense. Due to the angle of the rollers to the axis of the tool, the inscribed surface becomes somewhat hourglass-shaped, even though the cone angle of the rollers be approximately half that of the mandrel (assuming that true frusto-conical surfaces are used). These approximately conical surfaces may be altered somewhat from this condition in order to produce pressure at the desired point along the rollers, and also the desired pressure gradient along the workpiece as it feeds through the operating area of the tool.

In view of the taper of the rollers and the fact that the rollers are themselves moving at a constant angular velocity from end to end, it follows that there will inevitably be some sliding action of the roller over the surface of the workpiece, since a true geometrical point contact of the roller is impossible—particularly in view of the fact that the workpiece itself is being gradually deformed rather than suddenly reduced in its diameter. Considerable variation is possible in the construction of the device which may result in a distribution of the pressure from the mandrel to the rollers and from the rollers to the workpiece according to varying patterns. Assuming true frusto-conical surfaces in both the mandrel and the rollers, it would theoretically follow that the pressure of the rollers on the workpiece would take place at a central point along the rollers, and at the opposite ends of the rollers against the mandrel. As indicated above, however, it is desirable to alter the surfaces of the mandrel and rollers from true conical surfaces in order to create the pressure distribution which may be desired. Variations in the size of the tools to accommodate workpieces of various sizes will exert considerable influence on the configuration of the rollers and on the form of the inside diameter of the mandrel.

It must be kept in mind that "variation" in the case of tools having the function of reducing the diameter of the workpiece by a few thousandths of an inch is expressed in terms of measurement that are so small that it requires the use of sensitive and precise measuring instruments to detect it. To all outward appearances, the tool involves the use of frusto-conical rollers and frusto-conical surfaces in the mandrel.

Since the rollers are interposed between the workpiece and the inside diameter of the mandrel, it follows that the rotation of the mandrel with respect to the workpiece will generate a planetary action of the rollers as the burnishing operation proceeds. A cage to maintain the desired alignment of the rollers with respect to the axis of the tool (and, in one form of the invention, also axially along the tool) is provided which is similar in form to the conventional roller cage of a radially-loaded roller bearing. The rate of rotation of the mandrel with respect to the cage may be expressed as a quantity always greater than unity, as a result of the planetary system. Due to the skew angle of the roller with respect to that of the axis of the workpiece, and the fact that the helix established by this skew angle tends to be followed by the mandrel as well as the rollers, there is a tendency for the mandrel to move axially along the workpiece at a faster rate than the cage. This can be expressed otherwise by saying that the mandrel tends to overtake the rollers as the tool moves along the workpiece. This tendency is restricted by limiting the axial change of position of the rollers with respect to the mandrel through the engagement of suitable abutting surfaces against the inner ends of the rollers which are related in a positive fashion to the position of the mandrel during the burnishing operation. In the preferred form of the invention, this limiting of the axial movement of the rollers is accomplished through positioning the cage in a particular manner with respect to the mandrel, the roller-locating slots of the cage serving to maintain the rollers in the proper axial and also peripheral relationships.

The tapered relationship of the rollers to the inner surface of the mandrel results in a tendency of the tool to be self-releasing when its natural axial movement along the workpiece is prevented by a suitable stop on the machine to which the mandrel is attached. After stopping the axial movement of the mandrel with respect to the workpiece, the rollers tend to continue along their natural helical path along the workpiece. This action tends to move the rollers in the direction of the major diameter of the frusto-conical mandrel surface, and thereby release the burnishing pressure. After a small amount of such movement of the rollers with respect to the mandrel has taken place, the workpiece can be freely withdrawn from the tool.

Conversely, the finished diameter established by the tool is controlled through adjustment of the position of the rollers in the direction of the minor diameter of the inner mandrel surface. If the rollers are permitted to move further toward the minor diameter, the inscribed diameter inside the rollers becomes less, and results in a reduction of the diameter established on the workpiece by the tool.

The several features of the invention will be analyzed in detail through a discussion of the particular embodiments illustrated in the accompanying drawings. In the drawings:

Figure 1 presents an exterior view of a burnishing tool incorporating the preferred form of the invention.

Figure 2 is an end view of the device shown in Figure 1, taken on an enlarged scale.

Figure 3 is a section taken on the plane 3—3 of Figure 2.

Figure 4 is a section taken on the plane 4—4 of Figure 5.

Figure 7 is a section on a diametral plane showing a modified form of the invention.

Figure 8 is a section taken on the plane 8—8 of Figure 7.

Figure 5:
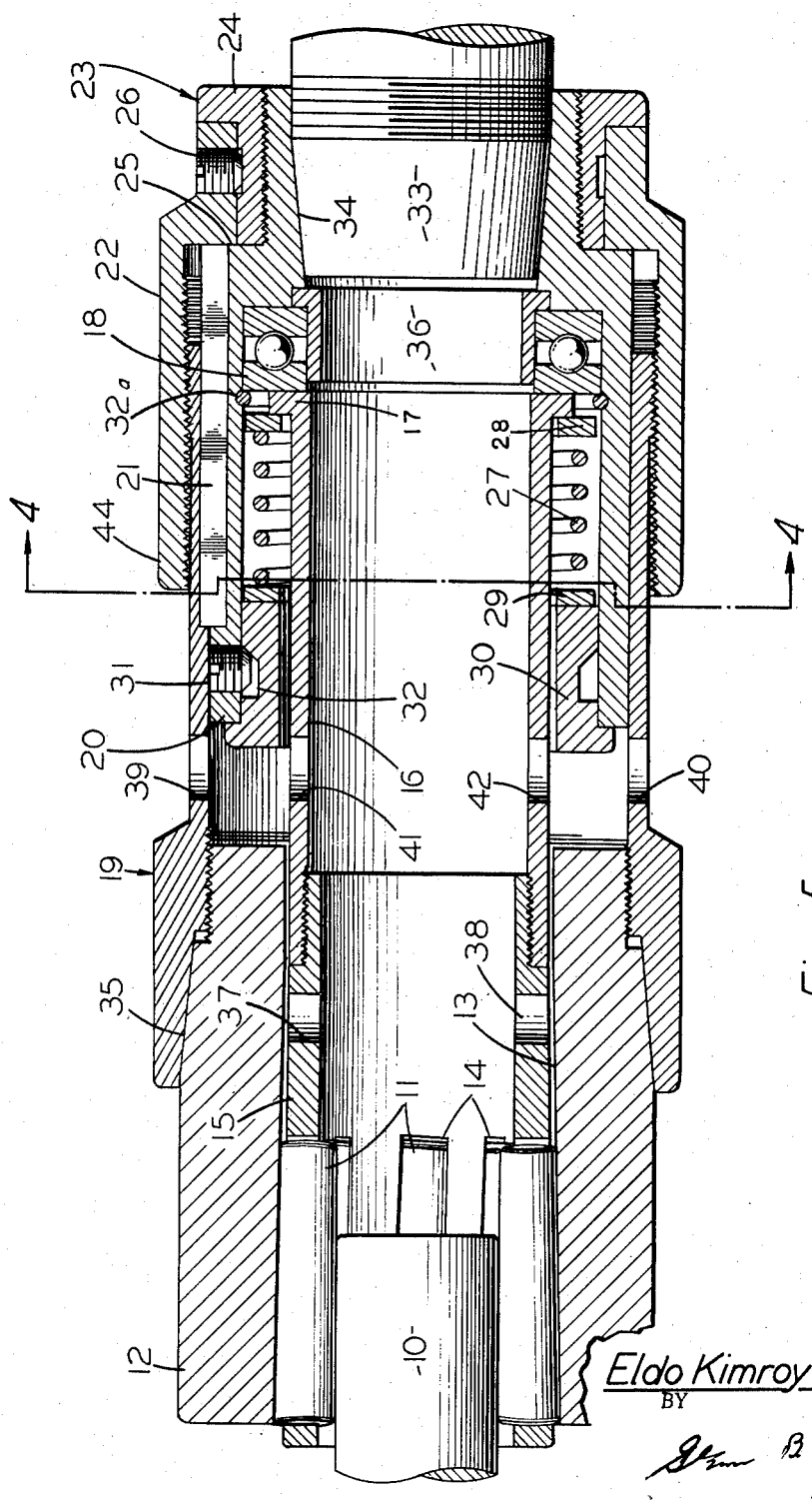
Figure 5 is a section taken on a diametral plane through the device shown in Figure 1, on an enlarged scale.
Figure 6:
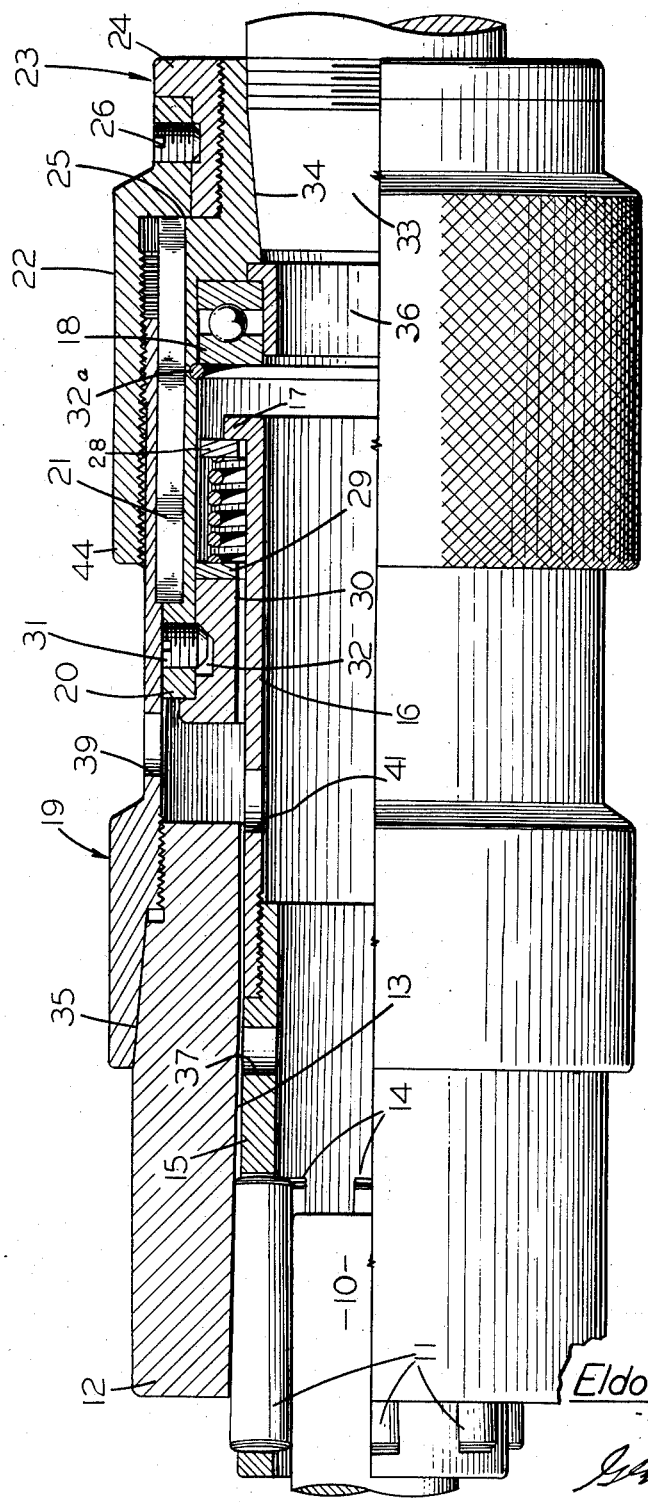
Figure 6 is a fragmentary section taken on a view similar to that of Figure 5, showing the device in the release position, in contrast to the burnishing position of Figure 5.

The details of the modification of the invention which is illustrated in Figures 1 through 6, inclusive, will be described with reference principally to Figure 5. This view shows a burnishing tool embodying this form of the invention in the condition representing the performance of the burnishing operation. A workpiece 10 having a cylindrical outer surface is shown under the influence of the tapered rollers 11, and pressure is maintained against the workpiece through the rollers by the annular mandrel 12 having a frusto-conical inner surface 13. As a result of the taper of the rollers 11 and that of the surface 13, the inscribed diameter inside the rollers (occupied by the workpiece 10) approaches a cylindrical conformation. Minute deviations from the true cylindrical shape are provided to allow for relatively gradual application of pressure as the workpiece 10 moves into engagement with the rollers 11, since the reduction in diameter effected by the burnishing operation does not take place instantaneously. It is recommended that the rough size of the workpiece 10 be selected so that the burnishing operation will result in a reduction in diameter of the order of a thousandth of an inch, with a maximum of about four thousandths of an inch. The exact amount will vary with the manner in which the rough surface is prepared, and with the metal itself.

The rollers 11 are disposed within a plurality of roller-locating slots 14 in the "cage" 15. The cage is essentially an annular cylindrical member having the primary function of spacing the rolls 11 about the axis of the tool, and also establishing an angle between the axis of the rollers and a plane passing through the axis of the tool. This angular relationship is best indicated in Figure 3, and results in a tendency for the rollers to move along helical paths as the workpiece moves axially with respect to the tool assembly. This self-feeding characteristic makes it unnecessary to force the tool along the axis of the workpiece in the performance of the burnishing operation.

The tendency of the mandrel to overtake the rollers during the operation of the tool, as outlined previously, is controlled through a system which establishes the additional function of the cage of controlling the axial position of the rollers with respect to the mandrel. A tubular cage shank 16 serves as an inward extension to the cage 15, and is normally fixed with respect thereto. The inner end of the cage shank 16 terminates in the annular flange 17, which normally rests in bearing engagement with the thrust bearing 18 during the burnishing operation. The tendency for the mandrel to move along axially at a faster rate than the rollers is therefore resisted by the thrust bearing 18, which is axially fixed with respect to the mandrel. An extension of the mandrel, which may be referred to as shank means for the mandrel for the sake of simplicity, includes a tubular outer shank portion 19, normally fixed with respect to the mandrel through threaded engagement as shown, and an inner shank portion, or housing, 20 which is itself axially slidable with respect to the outer shank portion 19. A key 21 engages suitable keyways formed in the inner and outer shank portions so that these two components are rotatably fixed with respect to each other. A micrometer nut 22 has threaded engagement with the outer mandrel shank portion 19, and this threaded engagement is varied when it is desired to adjust the operating diameter established by the burnishing tool. A retaining collar 23 is fixed with respect to the inner mandrel shank portion 20, and the axial position of the micrometer nut 22 with respect to the inner shank portion is maintained through the combined effect of the flange 24 and the shoulder 25 of the inner shank portion 20. Rotation of the micrometer nut 22 will therefore serve to move the mandrel with respect to the inner shank portion, with the direction of movement being determined by the direction of rotation. Once the desired adjustment has been achieved, the set screw 26 may be tightened to restrain any further movement. The net effect of the adjustment is to change the relative position of the frusto-conical surface 13 with respect to the abutment provided by the thrust bearing 18, and to thereby control the limit position of the cage 15 with respect to the mandrel. The rearward surfaces of the slots 14 serve as abutments against which the rear surfaces of the rollers bear during the burnishing operation, with the tendency of the mandrel to overtake the rollers being converted into a continuous pushing operation on the rollers themselves which keeps them abreast of the mandrel after the operating position has been established. This arrangement, of necessity, results in some degree of slippage between the rollers and the mandrel. The geometrical configuration would naturally cause a tendency for the rollers to engage the mandrel along on a relatively helical path, but the limitation imposed by the position of the cage generates a continuous planetary relationship.

When the end of the burnishing operation has been achieved, the natural tendency of the device to feed itself along the workpiece 10 can be limited by the engagement of the machine with a suitable stop (not shown). As a result of a cessation of relative axial movement, the natural tendency of the rollers 11 to continue along their helical path on the workpiece 10 results in a progressive movement of the rollers to the left (as shown at Figure 5) toward the major diameter of the frusto-conical surface 13 of the mandrel. Such movement tends to increase the diameter which confines the rollers, and correspondingly results in a decrease in pressure. This action continues until the burnishing pressure has been substantially released, or at least enough so to permit the withdrawal of the workpiece from the tool. The outward movement of the cage 15 accompanying the release of the rollers results in the movement of the flange 17 away from the thrust bearing 18, accompanied by the compression of the spring 27, which is confined between the thrust washers 28 and 29. (Refer to Figure 6.) The thrust washer 28 is positioned by the flange 17, and the washer 29 by the retaining ring 30. The position of the ring 30 is normally held fixed with respect to the inner mandrel shank portion through the engagement of the set screw 31 with the groove 32, as shown. The thrust bearing 18 is held in place during release period by the action of the snap ring 32a. It should be noted the workpiece may also become released from the influence of the tool by permitting the worked diameter to pass through the roller area.

A driving coupling for inducing rotation of the tool with respect to the workpiece 10 is represented by the member 33. The concentricity of the coupling connection is maintained through the engagement of the conical end surface 34 of the member 33 with the correspondingly-tapered conical surface in the inner shank portion 20. Similarly, the axial alignment of the mandrel 12 with respect to the outer mandrel shank portion 19 is maintained through interengaging frusto-conical surfaces as shown at 35. Preferably, a bearing cover 36 protects the thrust bearing 18 by closing off the annular opening in the area between the ball races.

In order to facilitate the assembly of the components, it is preferable to provide transverse holes as shown at 37—38 in the cage member, 39, 40 in the outer shank portion, and 41—42 in the cage shank portion to provide a means for applying necessary torque to assemble the threaded engagements.

It is preferable to apply some indicia to indicate the condition of the adjustment which establishes the operating diameter of the tool. The markings shown at 43 in Figure 1 on the micrometer nut 22, when considered in their relationship with the line 44 on the retaining collar 23, will give a visual indication of the degree to which the rollers 11 have been permitted to move toward the minor diameter of the frusto-conical surface 13 of the mandrel. It is also preferable that the outer surface 45 of the micrometer nut 23 be knurled to facilitate making the adjustment.

Referring to Figures 7 and 8, a modified form of the invention is illustrated which differs from the modification shown in Figures 1 through 6, inclusive, principally in that the axial thrust against the rollers which limits the tendency of the mandrel to overtake the rollers is not transferred through the medium of the cage assembly. In this modification of the invention, the group of rollers indicated at 46 is held in engagement with the workpiece 47 through a mandrel 48. A cage 49 is constructed as best shown in Figure 8, in which the slots receiving the rollers are formed to permit insertion of the rollers from the outside, but do not permit the rollers to move radially inward toward the axis of the tool. The result of the insertion of the rollers into the cage, and the cage inside the mandrel, is to fully position the rollers so that they will not drop out of engagement with the tool after withdrawal of the workpiece. After the assembly of the rollers and cage with the mandrel, the installation of the retaining cap 50 will maintain the assembled relationship of these components.

After the operating condition of the components has been reached, further tendency for the mandrel to move axially to the left faster than the rollers is limited by the engagement of the thrust bearing 51 with the rear surface of the rollers, the axial position of the thrust bearing 51 with respect to the mandrel being determined by the annular nut 52 having threaded engagement with the mandrel as shown. The adjustment of the operating diameter of the tool is effected by the insertion of a key 55, the key having a set of bevel-gear teeth machined on its inner end. These teeth mesh with the teeth 53, and rotation of the key will result in axial displacement of the member 52 with respect to the mandrel 48. In order to make apparent the axial position of the member 53 with respect to the mandrel, an access opening in the mandrel may be provided as indicated at 54, with suitable indicia being inscribed on the periphery of the member 52. A set screw 56 may be used to maintain the adjusted position.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A roller burnishing tool, comprising: an annular mandrel having the inside diameter thereof formed by a substantially frusto-conical surface; means forming a hollow mandrel shank normally fixed with respect to and extending coaxially from the end of said mandrel adjacent the minor diameter of said frusto conical surface, said mandrel shank means having an annular transverse shoulder on the inner surface of said mandrel shank means, said mandrel shank means including a first and second hollow members in telescoping relationship with each other, one of said members being fixed with respect to said mandrel, and the other of said members being axially slidable but non-rotatable with respect to said first member, said mandrel shank means also including an adjusting member axially fixed but rotatable with respect to said second member and having threaded engagement with said first member, said annular transverse shoulder being fixed with respect to said second member; a roller cage normally disposed within and substantially coaxially with said mandrel, said cage having a plurality of roller-locating slots having the axes thereof disposed in planes at an angle with respect to the axis of said frusto-conical surface, said slots having portions disposed to abut the opposite ends of said rollers on axial movement of said cage with respect thereto; a plurality of substantially frusto-conical rollers, one of said rollers being disposed in each of said slots, said rollers constituting a group establishing a substantially cylindrical inscribed diameter when in engagement with said frusto-conical surface; a cage shank normally fixed with respect to said cage and extending within said mandrel shank, said cage shank having a shoulder opposite said transverse mandrel shank shoulder; thrust bearing means interposed between said shoulders; retainer means normally fixed with respect to said mandrel shank means; biasing means operative between said cage shank and said retainer means; means for adjusting the axial position of said mandrel with respect to said mandrel shank shoulder; and coupling means for connecting said second member to a driving element.

2. A roller burnishing tool, comprising: an annular mandrel having the inside diameter thereof formed by a substantially frusto-conical surface; means forming a hollow mandrel shank normally fixed with respect to and extending coaxially from the end of said mandrel adjacent the minor diameter of said frusto-conical surface, said mandrel shank means having an annular transverse shoulder on the inner surface of said mandrel shank means, said mandrel shank means including a first and second hollow members in telescoping relationship with each other, one of said members being fixed with respect to said mandrel, and the other of said members being axially slidable but non-rotatable with respect to said first member, said mandrel shank means also including an adjusting member axially fixed but rotatable with respect to said second member and having threaded engagement with said first member, said annular transverse shoulder being fixed with respect to said second member; a roller cage normally disposed within and substantially coaxially with said mandrel, said cage having a plurality of roller-locating slots having the axes thereof disposed in planes at an angle with respect to the axis of said frusto-conical surface, said slots having portions disposed to abut the opposite ends of said rollers on axial movement of said cage with respect thereto; a plurality of substantially frusto-conical rollers, one of said rollers being disposed in each of said slots, said rollers constituting a group establishing a substantially cylindrical inscribed diameter when in engagement with said frusto-conical surface; a cage shank normally fixed with respect to said cage and extending within said mandrel shank, said cage shank having a shoulder opposite said transverse mandrel shank shoulder; thrust bearing means interposed between said shoulders; means for adjusting the axial position of said mandrel with respect to said mandrel shank shoulder; and coupling means for connecting said second member to a driving element.

3. A roller burnishing tool, comprising: an annular mandrel having the inside diameter thereof formed by a substantially frusto-conical surface; means forming a hollow mandrel shank normally fixed with respect to and extending coaxially from the end of said mandrel adjacent the minor diameter of said frusto-conical surface, said mandrel shank means having means forming a transverse abutment on the inner surface of said mandrel shank means; a roller cage normally disposed within and substantially coaxially with said mandrel, said cage having a plurality of roller-locating slots having the axes thereof disposed in planes at an angle with respect to the axis of said frusto-conical surface, said slots having portions disposed to abut the opposite ends of said rollers on axial movement of said cage with respect thereto; a plurality of substantially frusto-conical rollers, one of said rollers being disposed in each of said slots, said rollers constituting a group establishing a substantially cylindrical inscribed diameter when in engagement with said frusto-conical surface; a cage shank normally fixed with respect to said cage and extending within said mandrel shank, said cage shank having an abutment opposite said transverse mandrel shank abutment; means for adjusting the axial position of said mandrel with respect to said mandrel shank abutment; and coupling means for connecting said mandrel shank means to a driving element.

4. A roller burnishing tool, comprising: an annular mandrel having the inside diameter thereof formed by a substantially frusto-conical surface; means forming a hollow mandrel shank normally fixed with respect to and extending coaxially from one end of said mandrel, said mandrel shank means having means forming a transverse abutment normally fixed with respect to the inner surface of said mandrel shank means; a roller cage normally disposed within and substantially coaxially with said mandrel, said cage having a plurality of roller-locating slots having the axes thereof disposed in planes at an angle with respect to the axis of said frusto-conical surface; a plurality of substantially frusto-conical rollers, one of said rollers being disposed in each of said slots, said rollers constituting a group establishing a substantially cylindrical inscribed surface when in engagement with said frusto-conical surface; and coupling means for connecting said mandrel shank means to a driving element.

5. A roller burnishing tool, comprising: an annular mandrel having the inside diameter thereof formed by a substantially frusto-conical surface; means forming a hollow mandrel shank normally fixed with respect to and extending coaxially from one end of said mandrel; a roller cage normally disposed within and substantially coaxially with said mandrel, said cage having a plurality of roller-locating slots having the axes thereof disposed in planes at an angle with respect to the axis of said frusto-conical surface; a plurality of substantially frusto-conical rollers, one of said rollers being disposed in each of said slots, said rollers constituting a group establishing a substantially cylindrical inscribed surface when in engagement with said frusto-conical surface; transverse abutment means limiting the freedom of axial movement of said rollers toward the minor diameter of said mandrel frusto-conical surface; means for adjusting the axial position of said mandrel with respect to said transverse abutment means; and coupling means for connecting said mandrel shank means to a driving element.

6. A roller burnishing tool, comprising: an annular mandrel having the inside diameter thereof formed by a substantially frusto-conical surface; means forming a hollow mandrel shank normally fixed with respect to and extending coaxially from one end of said mandrel; a roller cage normally disposed within and substantially coaxially with said mandrel, said cage having a plurality of roller-locating slots having the axes thereof disposed in planes at an angle with respect to the axis of said frusto-conical surface; a plurality of substantially frusto-conical rollers, one of said rollers being disposed in each of said slots, said rollers constituting a group establishing a substantially cylindrical inscribed surface when in engagement with said frusto-conical surface; transverse abutment means limiting the fredom of axial movement of said rollers toward the minor diameter of said mandrel frusto-conical surface; and coupling means for connecting said mandrel shank means to a driving element.

References Cited in the file of this patent

UNITED STATES PATENTS

| | | |
|---|---|---|
| 1,423,378 | Wesson | July 18, 1922 |
| 1,627,152 | DeWitt | May 3, 1927 |
| 1,748,959 | Maupin | Mar. 4, 1930 |
| 1,837,624 | Maupin | Dec. 22, 1931 |
| 2,069,099 | Scatterwaite | Jan. 26, 1937 |
| 2,254,674 | Christman | Sept. 2, 1941 |
| 2,361,434 | Surtees | Oct. 31, 1944 |
| 2,546,756 | Knowlton | Mar. 27, 1951 |
| 2,737,996 | Toth | Mar. 13, 1956 |